March 13, 1934.   C. H. WHITE   1,951,003
PLANTER
Filed Nov. 12, 1930
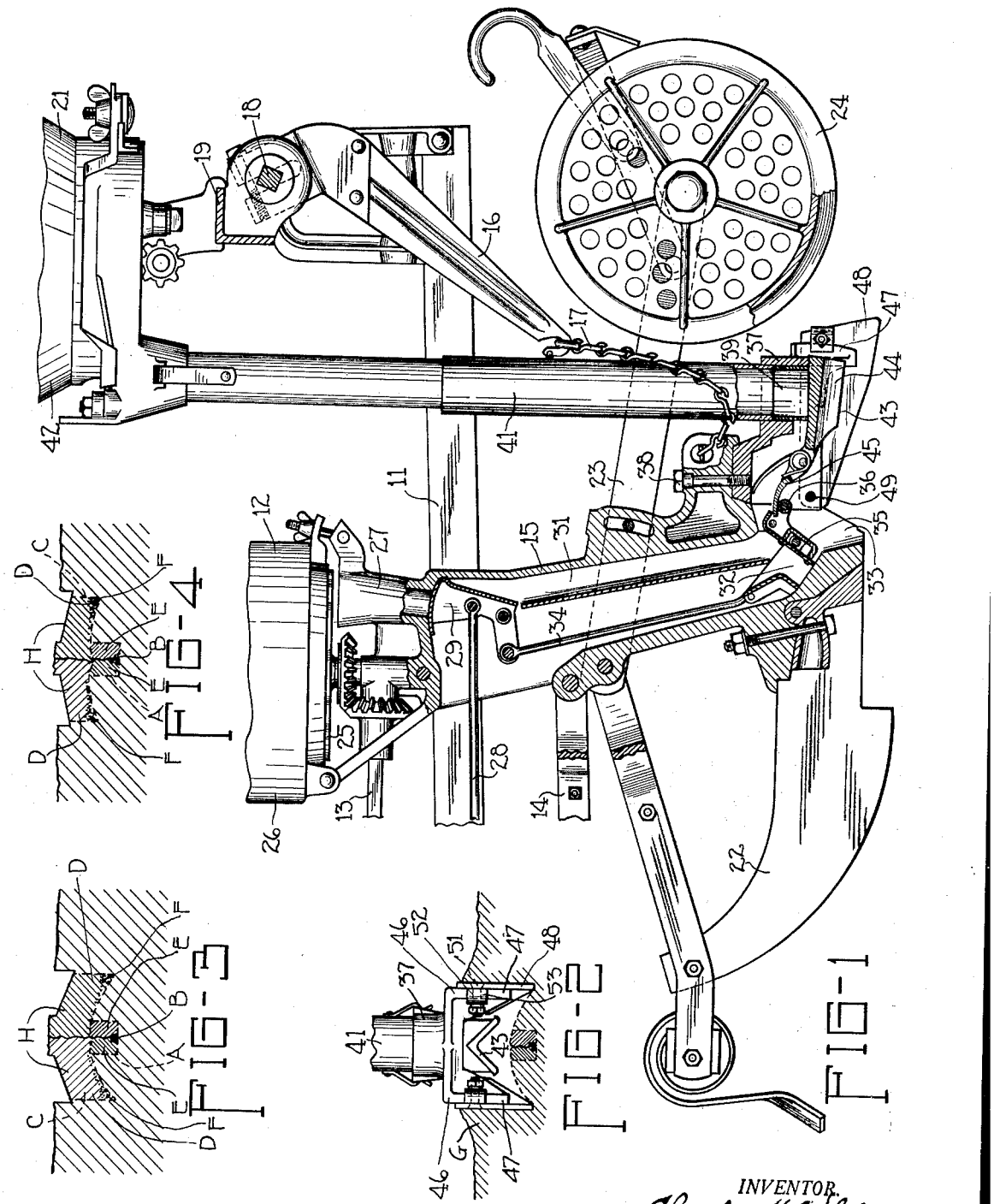
WITNESS
Walter Ackerman
INVENTOR.
Charles H. White
BY Brown, Jackson
Boettcher & Diener
ATTORNEYS.

Patented Mar. 13, 1934

1,951,003

UNITED STATES PATENT OFFICE 1,951,003

PLANTER

Charles H. White, Moline, Ill., assignor to Deere & Company, Moline, Ill., a corporation of Illinois Application November 12, 1930, Serial No. 495,046

15 Claims. (Cl. 111—73)

The present invention relates to planting implements designed for check row planting and more particularly to improvements in fertilizer attachments for such planting implements.

More specifically, the present invention may be characterized as an improvement upon the mechanism disclosed in my copending application Serial No. 439,567, filed March 28, 1930, for Planters. In the embodiment of the mechanism disclosed in the above noted copending application, I have disclosed a check row planter provided with an improved fertilizer attachment including a furrow opening member comprising integral side walls associated with the body of the attachment. Briefly, in operation, the function of such side walls is to provide auxiliary grooves in the furrow into which grooves the fertilizer is dropped, the seed being dropped in the main furrow so that the usual following press wheel or wheels in forcing the ground back over the furrow will cause such ground to compress the fertilizer in the auxiliary grooves whereby such fertilizer is adapted to impart germinating effect to the seeds by being spaced from such seeds by a wall of intermediately disposed earth or soil. The desirability of spacing the fertilizer from the seed is based upon the fact that maximum benefit in supplying the nourishing properties of the fertilizer to the seeds and to the growing plant is best derived by such spacing, since direct contact of the fertilizer and seed results in what is commonly known as "firing" of the seed. In operation, the point of the furrow cutting shoe or opener of the planting implement cuts a sharp groove in the soil, the flared portions of such shoe spreading out the soil to either side of the groove and providing a relatively widened furrow. The seed is then dropped into the furrow. Back of the point where the seed is dropped, the above noted side members of the fertilizing attachment widen the furrow still further adjacent the top thereof and form substantially V-shaped auxiliary furrows to each side of the main furrow leaving substantially triangularly shaped portions of soil standing along the sides of the main furrow. Upon formation of the auxiliary furrows, these triangularly shaped portions fall into the main furrow and onto the previously deposited seed, fertilizer being subsequently deposited in the auxiliary furrows. Following such deposits, the usual press wheel or wheels ride over the ridges formed by the furrow cutting shoe and push such ridges down over the fertilizer to cover both fertilizer and seed. The pressing effect of the press wheel tends to distribute a portion of the fertilizer which has been mainly deposited in the auxiliary furrows over the soil which has covered the seed deposited in the previously formed main furrow thus adequately distributing the fertilizer to the sides and above the deposited seed and yet providing for the desirable separation of the fertilizer from coming into direct contact with the deposited seed.

For purposes of obtaining maximum results from various grades and qualities of seeds, it is desirable to vary the depths to which the fertilizer is deposited in the auxiliary furrows whereby the germinating effect of the fertilizer may be effectively derived by accommodating the characteristics of the particular seed being planted. In some cases, it is desirable to place the fertilizer at the same depth as the seed, while in other cases it may be desirable to place the fertilizer in flanking position of the seed at even a greater depth than the seed. Then again, it may be desirable to deposit the fertilizer at a depth considerably above the depth at which the seeds are deposited.

With the above in view, the main object of the present invention is the provision of a fertilizer attachment for planters wherein the depth to which the fertilizer deposited may be regulated to accomplish the above mentioned results.

Another object of the present invention resides in the provision of an adjusting means in a fertilizer attachment whereby material alteration of the fertilizing attachment is not required.

Another object is the provision of such a depth adjusting means that adjustments whereof may be quickly, readily and suitably made in the field, so that planting of one class of seeds may be readily followed by planting of another class of seeds wherein the seed requirements as to the depth of deposit of the fertilizer may vary from the previously planted seeds.

Other objects and advantages will appear from the following detailed description of a preferred embodiment of the present invention illustrated in the accompanying drawing, in which:

Figure 1 is a fragmentary sectional view showing parts of a check row planter, and portions of the seed dropping mechanism, and fertilizer attachment and dropping mechanism in sectional detail;

Figure 2 is a fragmentary rear end view of the lower end of the fertilizing attachment showing the cooperation thereof with the side walls of a furrow;

Figure 3 is a section through a seeded and covered furrow illustrating the depth of fertilizer deposit achieved with the improved mechanism; and Figure 4 is a view similar to Figure 3 showing a seeded and closed furrow with fertilizer deposited at a depth higher than the depth of the deposited seed resulting from an adjustment of the improved mechanism.

Referring now more particularly to Figure 1 of the drawing, I have illustrated a fragmentary portion of a planter embodying the novel features of the present invention. Inasmuch as the planter is of an old and well known type, it has been deemed unnecessary to completely illustrate the same herein. Briefly, such planter mechanism comprises a frame 11 carrying thereon one or more seed feeding mechanisms 12 including a driving mechanism 13 therefor, such driving mechanism being suitably associated with a power transmitting mechanism from which power for operating the seed feeding mechanism is derived. The seed feeding mechanism 12 is preferably pivotally associated with the frame 11 by means of a link 14, the rear end of which is pivotally connected with the runner shank 15. This runner shank 15 is adapted to be raised to transport position by any conventional arrangement such for example as a lifting arm 16, the lower end of which is connected to the lower end of runner shank 15 by means of a flexible link such as chain 17, the upper end of such arm being suitably secured to a manually or power operated shaft 18 suitably journaled in brackets carried by frame 11, and carried by a cross member 19 of such frame in the rear of the seed feeding mechanism 12, as illustrated.

A fertilizer attachment 21 is suitably supported upon cross member 19 to the rear of the seed feeding mechanism 12.

Carried by and etxending forwardly from runner shank 15, is a runner or furrow opener 22, and etxending rearwardly and suitably pivotally connected with runner shank 15 by an arm or link 23 is a covering wheel 24, such covering wheel being also adapted to serve as a gage wheel.

As is customary in devices of this character, a seed feeding device 25 is provided in the lower end of the seed hopper 26 of seed feeding mechanism 12, such seed feeding device being adapted to drop a predetermined number of seeds into a seed chamber 27 responsive to the actuation of the usual seed feeding plate forming a part of the seed feeding device 25, such parts being ilustrated in external elevation since they do not form a part of the present invention.

In the course of operation of the planter mechanism as a check row planter, buttons on a wire stretched across the field to be planted are adapted by cooperation with elements carried by a check row head, to actuate a suitable mechanism including a rod or link 28 which is operatively associated with an upper valve member 29 suitably pivoted in the runner shank 15, a pull upon rod 28 being adapted to open valve 29, as will be readily understood by those skilled in the art.

Valve member 29 is adapted to normally close the lower end of the seed chamber 27, but upon rocking movement thereof responsive to a pull of the rod 28, is adapted to clear the opening of the chamber 27 and allow the accumulated seeds therein to fall by gravity down a passage 31 in runner shank 15, such seeds being adapted to be received at the lower end of such passage by a lower valve member 32, upon the actuation of which to open condition, the seeds are subsequently discharged through an opening 33 in the lower end of runner shank 15 into the furrow formed by runner or furrow opener 22.

The operating means for lower valve 32 comprises a rod 34, the upper end of which has pivotal connection with a tail extension provided upon upper valve member 29, the lower end of such rod having suitable pivotal connection with lower valve member 32. The construction and operation of the lower end parts carried by runner shank 15 are fully illustrated and described in my copending application Serial No. 403,698, filed October 31, 1929, and need not therefore be here specifically described. It wil suffice to say that such parts are so arranged as to permit of intermittent operation of a seed gate 35 disposed in the lower end of runner shank 15. Such seed gate is provided with a pair of rearwardly extending arms between which is mounted an antifriction roller 36, for a purpose to be hereinafter described.

The fertilizer attachment comprises a supporting member or valve boot 37 which is suitably secured to the runner shank 15 at the lower end thereof by means of a bolt 38. The upper side of boot 37 is provided with an opening 39 for receiving a conveyor tube 41 extending downwardly from the fertilizer hopper 42 through which the fertilizer is fed from such hopper. A fertilizer valve 43 is pivotally mounted in boot 37 such valve comprising a rearwardly extending wedge-shaped portion 44 and a forwardly extending arm 45 which projects over roller 36 and is normally in contact therewith. It will be readily apparent that upon upward movement of roller 36, wedge-shaped portion 44 will move downwardly permitting dropping of fertilizer.

As will be apparent from Figure 2, boot 37 comprises spaced side walls 46 each provided at the rear ends thereof with a downwardly extending flange 47. A pair of auxiliary side members 48 are pivotally connected at their forward ends by means of a pin or bolt 49 to the outer sides of the forward end of boot 37 for pivotal movement along the outer faces of side portions 46 of such boot. The under edges of such side members 48 are formed on a bevel downwardly from front to rear as will be clearly apparent from Figures 1 and 2. It will be further noted that side members 48 extend rearwardly beyond the downward extensions 47. The projecting portion of each side member 48 is provided with a transversely extending bolt 51 carrying thereon a substantially L-shaped clamping bracket 52, the laterally extending leg 53 of which is adapted to abut the inner face of the projecting portion of side member 48, the other substantially right angularly disposed leg portion of clamping bracket 52 being adapted to bear against the rearwardly extending flange 47 of boot 37. It will be readily apparent that upon loosening the nut associated with bolt 51, side members 48 may be vertically adjusted and by subsequent drawing up of the nut, such side members may be reclamped in adjusted position.

It will be noted from Figure 2 that the boot 37 and the associated adjustable side members 48 are flared or formed on a taper from front to rear or in the normal operative direction of the planter and attachment so as to provide a spreading effect in operation.

Referring now more particularly to Figures 3 and 4, I have illustrated in section two seeded and covered rows showing resultant seeding and fertilization responsive to adjustments of the side members 48.

In operation, runner or furrow opener 22 provides a main furrow A, the rear portion of such furrow opener being adapted to spread the soil to either side of the main furrow A. The seed B is then dropped into the furrow by the operation of the seed feeding mechanism 12. Slightly back of the point where the seed is dropped, side members 48 widen out the furrow as indicated at C forming V-shaped auxiliary furrows D, one to each side of the main furrow A leaving substantially triangular shaped portions of the soil standing along the side walls of main furrow A. Such triangular shaped portions are relatively thin particularly adjacent the tops or apices thereof so that such portions fall over into the main furrow A and onto the seed as shown in Figures 3 and 4 at E. The fertilizer is then deposited and caused to fall into the auxiliary furows D by the wedge-shaped configuration of valve 43 as will be clearly apparent from Figure 2, the fertilizer being indicated in Figures 3 and 4 by the reference character F. The press wheel 24 then rides over the ridges G (see Figure 2) and forces such ridges down on top of the fertilizer to cover the fertilizer and seed covering soil E, as indicated at H.

By varying the positions vertically of side members 48, it will be readily apparent that the depth of formation of the auxiliary furrows D may be varied. Such variation of the depths of the auxiliary furrows D results in variation of the depth of deposit of the fertilizer as will be clearly apparent from a comparison of Figures 3 and 4.

Thus, where seed such as is deposited and covered in the manner of the section shown in Figure 3, is adapted to be planted, requiring deposit of fertilizer at a depth of substantially the same depth of deposit of the seed, the requirement of such seed may be readily accommodated by a simple adjustment of the side members 48. Where seed does not require fertilization to a degree commensurate with the depth of the seed, such requirement may be equally accommodated by an adjustment wherein the resultant planting is of the character disclosed in Figure 4. It will be readily apparent that if the seed requires fertilization to a depth greater than the depth of deposit of the seed, such requirement may be accommodated by a further lowering of the side members 48 to provide the desired depth of the auxiliary furrows.

It will be readily apparent that a further very desirable result of the present method of varying the depth at which the bulk of the fertilizer is deposited is obtained in that the small amount of fertilizer dropping from the fertilizer valve 43 directly above the seed, is deposited about the same distance from the seed irrespective of the depth at which the greater portion of the fertilizer to each side of the seed is deposited. It will be noted from an inspection of Figures 3 and 4, that the soil which falls over into the main furrow illustrated in both figures is of substantially the same depth due to the tapering of the lower edges of the side members 48. It is to be noted that for all variations of the vertical adjustments of side members 48, the fertilizer can not be placed close enough to the seed to "fire" the seed irrespective of the depth at which the side members 48 are adjusted to operate.

While I have illustrated and described a preferred embodiment of my invention, I do not wish to be limited thereto since it will be readily apparent to those skilled in the art that certain changes may be made therein without departing from the essence of the invention or the spirit and scope of the appended claims.

What I claim and desire to secure by Letters Patent is:

1. In a planter, the combination of a seed feeding mechanism, furrow opening means adapted to form a main furrow for receiving seeds deposited by said seed feeding mechanism, a fertilizer mechanism, and means fixed to the rear side of said furrow opening means for forming auxiliary furrows adapted to receive fertilizer from said fertilizer mechanism including adjustable means for varying the depth of formation of said auxiliary furrows whereby the depth of deposit of the fertilizer may be varied with respect to the depth of deposit of seeds by said seed feeding mechanism in said main furrow.

2. In a planter, the combination of a seed feeding mechanism, furrow opening means adapted to form a main furrow for receiving seeds deposited by said seed feeding mechanism, a fertilizer mechanism, a fertilizer depositing means associated with said fertilizer mechanism including adjustable flared side members for forming auxiliary furrows flanking said main furrow for receiving fertilizer from said fertilizer mechanism, whereby adjustment of said side members varies the depth of said auxiliary furrows and varies the angularity of the bottom thereof whereby the depth of deposit of fertilizer may be varied with respect to the depth of deposit of seeds by said seed feeding mechanism in said main furrow, and means for retaining said side members in adjusted position.

3. A fertilizer attachment for planter mechanisms comprising a supporting member, means controlling deposit of fertilizer associated with said supporting member, a telescopic member connecting said supporting member to said controlling means, and a wedge-shaped member associated with said supporting member for forming an auxiliary furrow on the side of the previously formed main furrow for reception of fertilizer, said wedge-shaped member being adjustable for varying the depth of formation of said auxiliary furrow whereby the depth of deposit of the fertilizer may be varied.

4. A fertilizer attachment for planter mechanisms comprising a hopper, a boot adapted to cooperate with the ground for spreading portions of the side walls of a previously formed furrow, means connecting said hopper and boot for conveying fertilizer to said boot, means controlling deposit of fertilizer from said boot, and adjustable means associated with said boot for forming auxiliary furrows flanking said previously formed furrow, for the reception of fertilizer therein, said adjustable means being adapted to vary the depth of formation of said auxiliary furrows whereby the depth of deposit of said fertilizer may be varied.

5. A fertilizer attachment for planter mechanisms comprising a boot having side walls adapted to operate upon the side walls of a previously formed furrow with a spreading action, and adjustable means associated with said boot and adapted to form auxiliary furrows for receiving fertilizer from said boot, adjustments of said means being adapted to vary the depth of formation of said auxiliary furrows whereby the depth of deposit of fertilizer may be varied.

6. A fertilizer attachment for planter mechanisms comprising a ground engaging member having side walls formed on a taper in the normal operative direction of movement of the attachment, and side members carried by said side walls adapted to spread portions of the side walls of a previously formed furrow and to form auxiliary furrows for the reception of fertilizer therein, said side members being independently adjustable to vary the depth of formation of said auxiliary furrows whereby the depth of deposit of the fertilizer may be varied.

7. A fertilizer attachment for planter mechanisms comprising a ground engaging member having side walls formed on a taper in the normal operative direction of movement of the attachment, side members carried by said side walls adapted to spread portions of the side walls of a previously formed furrow and to form auxiliary furrows for the reception of fertilizer therein, said side members being independently adjustable to vary the depth of formation of said auxiliary furrows whereby the depth of deposit of the fertilizer may be varied, and means for securing said side members in adjusted position.

8. In a planter, the combination of a seed feeding mechanism, furrow opening means adapted to form a main furrow for receiving seeds deposited by said seed feeding mechanism, a fertilizer mechanism, fertilizer depositing means associated with said fertilizer mechanism including adjustable side members for forming auxiliary furrows of various adjusted depths flanking said main furrow for receiving fertilizer from said fertilizer mechanism, a gate pivotally mounted in said depositing means to control the movement of fertilizer therethrough and a wedge-shaped distributor formed as a part of said gate for directing the fertilizer into said auxiliary furrows.

9. In a planter, the combination of a seed feeding mechanism, furrow opening means adapted to form a main furrow for receiving seeds deposited by said seed feeding mechanism, a fertilizer mechanism detachably secured to said planter, a fertilizer depositing means associated with said fertilizer mechanism including adjustable side members for forming auxiliary furrows flanking said main furrow for receiving fertilizer from said fertilizer mechanism, whereby adjustment of said side members varies the depth of formation of said auxiliary furrows, and a wedge-shaped distributor pivotally mounted in said depositing means and controlling the discharge of fertilizer from said mechanism, said wedge-shaped distributor adapted to direct the fertilizer into said auxiliary furrows in any of their various depths of formation whereby the depth of deposit of fertilizer may be varied with respect to the depth of deposit of seeds by said seed feeding mechanism.

10. A fertilizer attachment for planter mechanisms comprising a hopper, a boot adapted to cooperate with the ground for spreading portions of the side walls of a previously formed furrow, means connecting said hopper and boot for conveying fertilizer to said boot, adjustable means associated with said boot for forming auxiliary furrows flanging said previously formed furrow for the reception of fertilizer therein, said adjustable means being adapted to vary the depth of formation of said auxiliary furrows whereby the depth of deposit of said fertilizer may be varied, and a wedge-shaped distributor pivotally mounted in the boot for controlling deposit of fertilizer from said boot, said wedge-shaped distributor adapted to direct a major portion of the fertilizer into said auxiliary furrows.

11. A fertilizer attachment for planter mechanisms comprising a hopper, a boot adapted to cooperate with the ground for spreading portions of the side walls of a previously formed furrow, telescopic means connecting said hopper and boot for conveying fertilizer to said boot, adjustable triangular members pivotally mounted on said boot for forming auxiliary furrows at various adjustable depths flanking said previously formed furrows, and a wedge-shaped distributor pivotally mounted in said boot for controlling deposit of fertilizer from said boot, said wedge-shaped distributor being adapted to direct a major portion of the fertilizer into said auxiliary furrows at any of their adjusted depths.

12. A fertilizer attachment for planter mechanisms comprising a hopper, a boot adapted to cooperate with the ground for spreading portions of the side walls of a previously formed furrow, means connecting said hopper and boot for conveying fertilizer to said boot, a wedge-shaped distributor controlling and directing the deposit of fertilizer from said boot, and adjustable side members associated with said boot for forming auxiliary furrows flanking said previously formed furrow, said adjustable side members adapted to vary the depth of formation of said auxiliary furrows, whereby said wedge-shaped distributor is adapted to direct the fertilizer into the auxiliary furrows in any of their various depths of formation.

13. In a planter, the combination of a seed feeding mechanism, furrow opening means adapted to form a main furrow for receiving seeds deposited by said seed feeding mechanism, a fertilizer mechanism, and a fertilizer depositing means associated with said fertilizer mechanism and comprising a boot adapted to cooperate with the ground for spreading portions of the side walls of said main furrow, said boot having a pair of adjustable side members thereon for forming auxiliary furrows flanking said main furrow for receiving fertilizer from said fertilizer mechanism, adjustments of said side members adapted to move them relative to said boot, said side members being of sufficient dimension that no opening occurs between them and said boot in any position of adjustment whereby to prevent the escape of fertilizer therebetween.

14. A fertilizer attachment for planter mechanisms comprising a hopper, a boot adapted to cooperate with the ground for spreading portions of the side walls of a previously formed furrow, means connecting said hopper to said boot for conveying fertilizer to said boot, means controlling deposit of fertilizer from said boot, adjustable triangular side members pivotally mounted on said boot for forming auxiliary furrows flanking said previously formed furrow, and means for securing said side members in a plurality of adjusted positions relative to said boot, said side members being of such dimension that no opening can occur between the bottom of the boot and the top of the side members in any one of the adjusted positions of the members on the boot.

15. A fertilizer attachment for planter mechanisms comprising a hopper, a boot having side walls adapted to cooperate with the ground for spreading portions of the side walls of a previously formed furrow, means connecting said hopper and boot for conveying fertilizer to said boot, adjustable triangular plates associated with said boot for forming auxiliary furrows flanking said previously formed furrow for reception of fertilizer therein, and means for adjusting said plates substantially vertically relative to the side walls of said boot to vary the depth of said auxiliary furrows and to vary the angularity of the bottom thereof, said plates being of such width that no opening will occur between the top of said plates and the bottom of the side walls of said boot whereby to prevent the escape of fertilizer therebetween.

CHARLES H. WHITE.